Sept. 12, 1939.  G. W. STETSON  2,173,076
AUTOMOTIVE VEHICLE AND DEMOUNTABLE CAMPING CABIN
Filed July 26, 1937  2 Sheets-Sheet 1
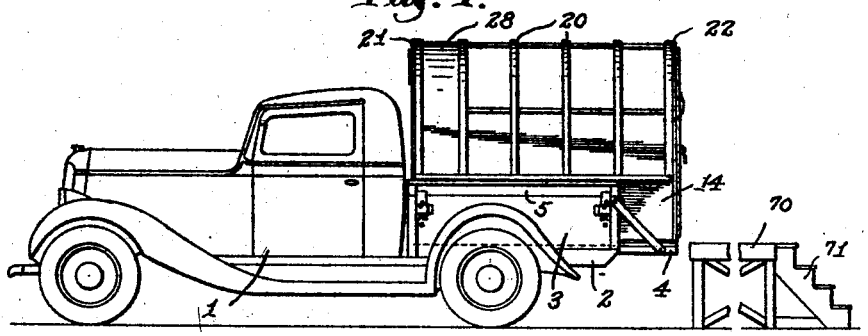
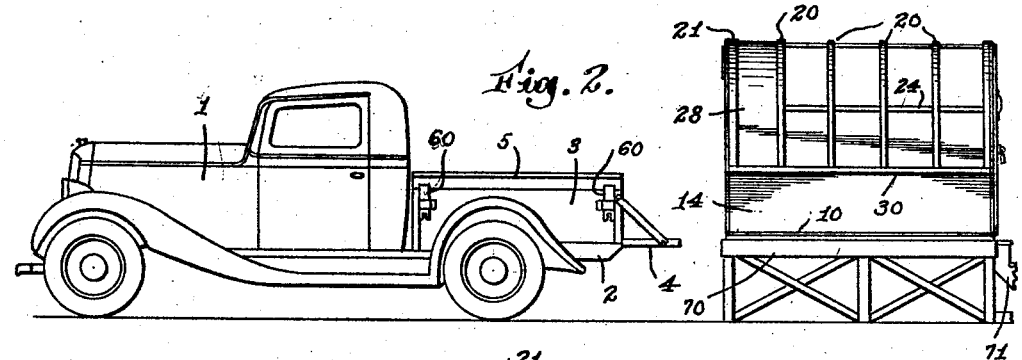
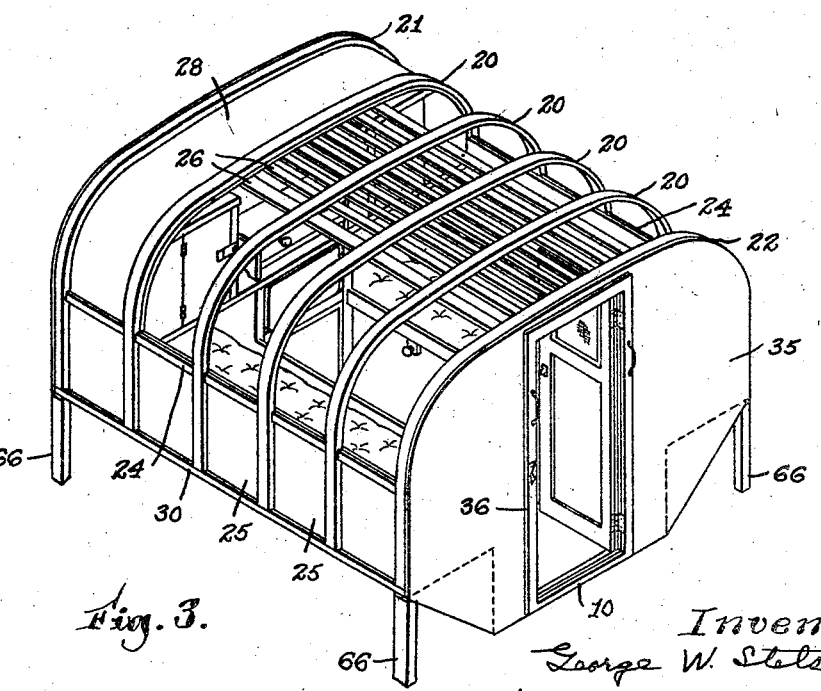

Sept. 12, 1939.  G. W. STETSON  2,173,076
AUTOMOTIVE VEHICLE AND DEMOUNTABLE CAMPING CABIN
Filed July 26, 1937  2 Sheets-Sheet 2
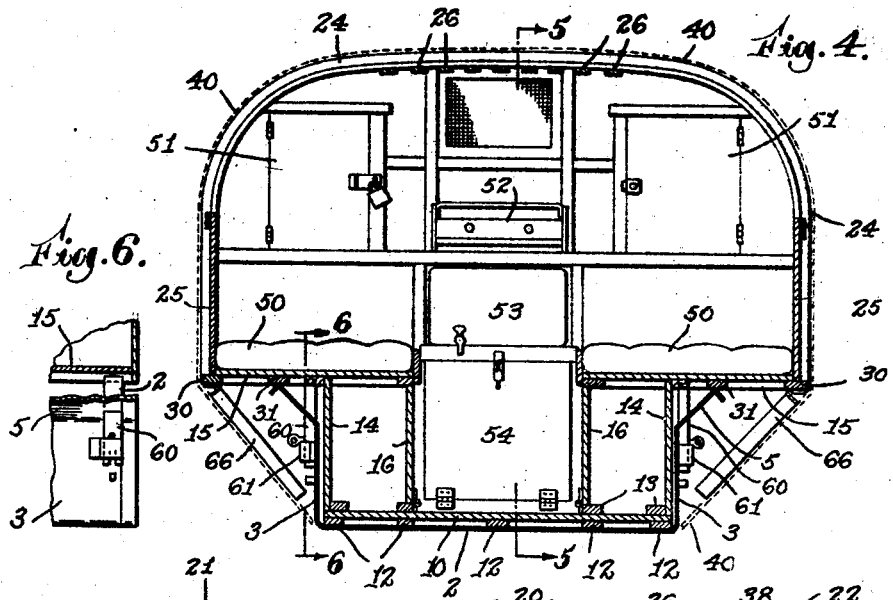
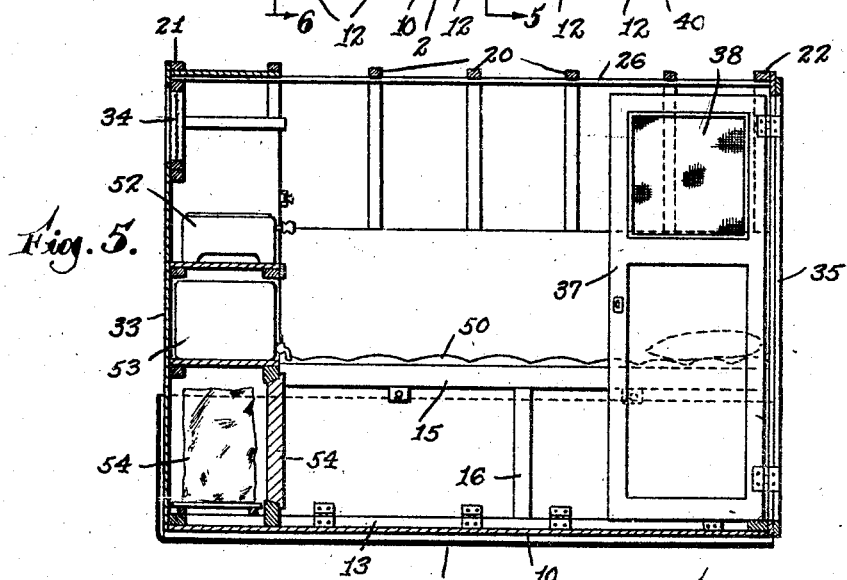
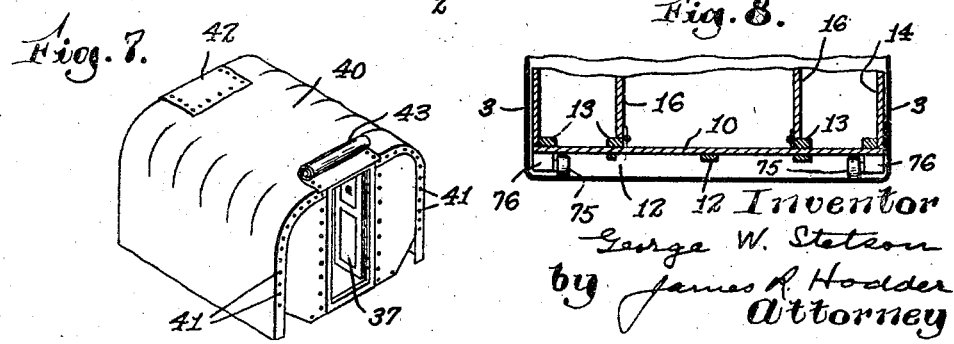
Inventor
George W. Stetson
by James R. Hodder
Attorney Patented Sept. 12, 1939

2,173,076

UNITED STATES PATENT OFFICE 2,173,076

AUTOMOTIVE VEHICLE AND DEMOUNTABLE CAMPING CABIN

George W. Stetson, Hingham, Mass.

Application July 26, 1937, Serial No. 155,655

1 Claim. (Cl. 296—23)

My present invention is a novel combination of an automotive vehicle and a mountable and demountable cabin or house-like structure, both vehicle and cabin being arranged for interlocking to permit ready removal and replacement.

Heretofore it has been customary to build or fit out an automotive vehicle, such as a passenger automobile or truck, with permanent sleeping accommodations or living quarters, or to arrange for such accommodations and living quarters in a separable trailer. Both of these prior methods are expensive and objectionable since the special fitting of an automobile with permanent housing and living quarters prevented the use of the vehicle for any other purpose, while the arrangement of two units, viz., an automobile and a trailer, was expensive and presented constant difficulties in towing the trailer, maintaining an efficient hitch between auto and trailer, backing up the same, or finding suitable camping sites in which the trailer could be housed, the disadvantage of wearing out tires on the trailer, and swerving when towing on the roadway, and other objections.

My present invention contemplates the elimination of former constructions above briefly outlined and the arrangement of a detachable or demountable cabin, house, body, or the like which will interlock with the vehicle itself, thus presenting a single unit for road travel and yet one which can be readily demounted and left as a permanent camp for living quarters, while freeing the truck or vehicle for ordinary and separate use.

Thus with my invention it is possible to secure the full advantages of a separate house or camp and a separate automotive vehicle, together with the further advantage of assembling the house and vehicle and quickly interlocking the same into a complete traveling unit when desired.

In carrying out my invention I may and preferably do utilize any standard form of automotive chassis, or a standard type of truck body, and provide a separate attachable and detachable cabin or house which may be slid onto the truck body and interlock with the same by any operative bolts or other locking instrumentalities, constructing the demountable cabin as a complete house or living unit, with provision and capacity for sleeping quarters, stove, ice chest, shelves, lockers, etc., which are equally serviceable whether the cabin is mounted on the truck or is demounted and set up as a unit, freeing the truck for ordinary use.

My invention is not only intended for camping and auto trips or excursions, but is also intended for a wide variety of uses, such as for example as for logging cutters, carrying gear equipment and living quarters into places remote from inns or hotel accommodations; traveling threshing machine operators, artesian well diggers, or traveling salesmen of various kinds carrying equipment and living quarters.

An additional important advantage of my present invention, comprising two separable units, is that the automotive vehicle with the demountable camping cabin may be driven at any desired speed of which the truck is capable; whereas in an auto towing a trailer, the speed of travel is necessarily limited.

Furthermore, the truck being the only road-traveling vehicle requires but a single license and license fee, number plates, or the like, and the demountable camping cabin is thus carried by the truck and free of separate license plates, registration, taxes, and the like.

A still further advantage is that the demountable cabin is also free of the expense incident to springs, tires, wheels, running gear, etc., as this is all provided by the truck on which the cabin is mounted when traveling.

While I contemplate the use of any suitable cabin structure capable of being fitted to and within the truck body of the automotive vehicle, I may and preferably do provide a set of rollers by which the camp body may be rolled out of the truck and down a pair of skids for permanent camping use, and may similarly be easily mounted in the truck by rolling the same up a pair of skids. In small units the entire camping structure may be easily lifted off by three or four hands and as easily lifted back on to the truck; but for larger units I contemplate the use of rollers and either a block and tackle or winch, which may be arranged to be driven directly from the motor of the truck, if desired, as is at present in common use with power dumping vehicles.

Also I contemplate constructing the demountable cabin of any suitable material being preferably, and as herein illustrated, shown as made of a relatively strong framework of wood with light panels fitted therebetween, and with a waterproof canvas cover. Provision is made for attaching and detaching the canvas cover so as to roll back the same and allow the sun to shine in, simulating the advantages of a tent in this feature, while openings in the canvas for a cover or flap for rear door or front windows may also be provided. The framework may be of metal and the panels of metal, wood, plywood, or any other suitable or similar material, and a permanent waterproof roof may be applied in place of the canvas cover, if desired.

Also I contemplate the use of folding legs to steady the camp when detached from the wagon or chassis and resting permanently on a ground or platform, together with suitable steps either when on the platform or in the truck.

In combining an automotive vehicle or chassis, such as the typical "pick up and delivery" truck body of the various standard automobile construction, of a substantially standard width and depth, I contemplate the building of a cooperative demountable camping body therefor, making the same of such dimensions as to fit a considerable range of standard truck bodies without alteration of the main dimensions of the lower portion of the demountable cabin. Windows and ventilators may also be provided, as desired, although in the simpler form illustrated in the drawings I have not shown these details.

Other important advantages, and arrangement of parts will be hereinafter more fully pointed out and claimed.

Referring to the drawings,

Fig. 1 is a side view of a typical delivery truck, together with my demountable cabin thereon;

Fig. 2 illustrates the cabin demounted and resting on a platform;

Fig. 3 is an enlarged perspective view illustrative of a preferred method of construction, and Figs. 1, 2, and 3 showing the same without the canvas covering;

Fig. 4 is a cross-sectional view looking forward of the demountable cabin;

Fig. 5 is a longitudinal cross-sectional view on the line 5—5 of Fig. 4;

Fig. 6 is a fragmentary view of the locking devices on the line 6—6 of Fig. 4;

Fig. 7 is a perspective on a small scale illustrating the cabin resting on the ground with the door flap rolled up; and Fig. 8 is a fragmentary cross-sectional view illustrating rollers to facilitate the mounting and demounting of the cabin and the assembling of same on the truck or up or down the skids to the ground or platform.

As shown in the drawings, I illustrate a standard type of so-called "pick up and delivery truck", designated generally at 1, with a standard type of truck body comprising the bottom 2, sides 3—3, tailboard 4, and the usual flaring top boards 5—5. My demountable cabin for assembling and interlocking with the truck body is formed with a lower portion to fit within the truck body of substantially the same width as the body and length as the combined body and tailboard 4 together will allow, although the body may be of either less or greater length without detracting from the advantages and features of the invention.

The cabin comprises a bottom framework 10 suitably braced with wearing strips 12—12 and inside braces 13—13, the same being fitted with upwardly extending side walls 14—14 of a height sufficient to cooperate with the height of the truck body 3 and side boards 5, as clearly shown in Figs. 1 and 4. Extending laterally over the sides 14 are horizontal transoms 15—15 on each side, thus giving greater width to the cabin than that of the truck with which it is assembled, and also providing benches, seats, or carrying spacing within. One or more intermediate braces 16, particularly at the rear and front ends, are also provided to brace and secure the side transoms 15 and to give rigidity to the entire structure.

From each edge of the outer surface of the transoms 15—15 I provide, in preferred form and as herein shown, a series of bent bows or frames preferably of wood and designated at 20—20—20, with the forward bow 21 and the rearward bow 22. These bows are steamed and formed in position and are fitted as shown, and secured by side braces 24 at each side at an appropriate distance above the transoms 15 to constitute both a brace and a permanent enclosed part of the body, the space between the side braces 24 and the transom 15 being enclosed by panels 25—25. A series of top stringers 26—26 are fitted to also stiffen and hold the bows 20 in place, these top stringers running throughout the length of the cabin and being here shown as nine in number, although any suitable number and size may be employed.

Preferably, also, I enclose the front portion of the top between the front frame 21 and the next frame 20 with light wooden panels, as indicated at 28, similar to the panels 25 on each side. Reinforcing stringers 30—30 are also applied on each side to give added strength to the joint between the outer edge of the transoms 15 and the heel of each bow 20—20 as well as the end bows or frames 21 and 22. If desired, a stringer or wearing strip 13 may also be fitted in position on the under side of the transom 15 to constitute a brace and wearing element on the top edge of the side boards 5—5, as illustrated in Fig. 4.

The front of the cabin is preferably enclosed by a panel of plywood 33, being provided with a front window 34, and the rear portion is also covered with plywood 35 provided with a doorway 36, to which is fitted a swinging door 37 also provided with a window 38. The windows 34 and 38 are preferably screened to direct ventilation therethru, and may be left either open or covered by the waterproof canvas covering 40 which I utilize as a light, strong, and efficient waterproof covering for the entire cabin and which may be secured in any detachable manner desired to the framework.

As shown in Fig. 7, the canvas may be attached by a series of fasteners of any kind 41, and in this form a front flap 42 to cover the window or screen 34 is provided as well as a door covering flap 43 at the rear, making both door and window waterproof in a quickly adjustable and efficient manner.

The demountable cabin is preferably of sufficient length so as to afford full sleeping accommodations on the transoms 15—15, cushions 50—50 being provided thereon for that purpose, and leaving space at the forward end for lockers 51—51, a stove 52, water cooler 53, and ice receptacle 54, thus affording complete living accommodations in the cabin, if desired.

To more firmly interlock the cabin and truck body, in addition to the lower part of the cabin structure which provides a fairly snug sliding fit inside the truck body when assembled therein, I provide two or more pairs of locking bolts or slides. These are positioned preferably on the outside of the sides 3 of the truck body at the front and rear of the body and constitute sliding bolts 60 adapted to slide thru slots cut therefor in the side boards 5—5, which bolts will slide in sockets 61 and when moved upwardly will engage with the under side of the transom 15 of any reinforcing strip or socket fitted on the under side of same to interlock both body and truck together. A handle 63 is provided with the bolt which may be spring actuated or manually moved into or out of locking position. When the demountable cabin is assembled with the truck body it is instantly locked by these sliding bolts and, similarly, instantly unlocked by moving the same downwardly.

The only change in work required on the truck body to fit it for holding the demountable cabin in assembled position consists in the application to the truck body of these locking slides and the forming of appropriate slots for the slides thru the boards 5.

When the demountable cabin is moved from the chassis or truck it will ordinarily rest with sufficient stability on the bottom boards, but in order to insure further rigidity when thus used as a camp, I provide a series of folding legs or supports 66 at each corner which would fold up when not in use or be fitted in any other desired manner.

The cabin can be mounted on the ground supports or a platform, as shown at 70, with a pair of light steps 71 which may be carried with the truck and used with the cabin on the truck, being of appropriate height therefor when temporary stops or encampments are desired.

In Fig. 8 I have illustrated a pair of rollers 75 at one end of the demountable body fitted in bearing blocks or springs 76—76 to facilitate the demountable cabin into or out of the truck body and on to or off of the platform 70 or the pair of skids when assembling or disassembling the cabin from the truck. A series of such rollers 75, but preferably at least four, with opposite pairs at each end, would be provided for this purpose as will be readily appreciated.

Thus it will be appreciated that I have provided a novel form of automotive vehicle, with a demountable cabin, consisting in two separate units separately usable as independent complete units, or usable together as a combined complete unit; and it is this cooperative combination with capacity for separate and combined use and quick attachment and detachment which I wish to claim herein broadly.

I claim:

In combination, a complete automotive unit, including a truck body, having sides and an open end, a complete rigid camping cabin of greater length and width than said truck body, constructed and arranged as a weatherproof structure suitable for habitation while on the truck body or when removed therefrom, formed with a bottom portion adapted to correspond in external width with the internal width of the truck body and of greater length than said truck body, capable of mounting on said truck body and demountable therefrom, laterally extending permanent wing portions positioned parallel with and above each of the sides of said truck body, and extending beyond each side of the truck, constituting sitting and sleeping transoms for said camping cabin, a solid portion in said cabin at the forward end holding a stove, ice-chest, and locker members aiding as a counter-balancing weight to hold the camping cabin in position on the truck body with the rear of said cabin extending beyond said truck body, together with movable interlocking members on the truck body and the cabin, cooperating to unite said body and cabin during transportation.

GEORGE W. STETSON.